United States Patent [19]

Marko et al.

[11] Patent Number: 5,239,313

[45] Date of Patent: Aug. 24, 1993

[54] CONTINUOUSLY VARIABLE RESOLUTION LASER PRINTER

[75] Inventors: Kurt R. Marko; Chris A. Storlie, both of Boise, Id.

[73] Assignee: Hewlett-Packard Company, Palo Alto, Calif.

[21] Appl. No.: 920,213

[22] Filed: Jul. 24, 1992

[51] Int. Cl.⁵ .............................................. H04N 1/21
[52] U.S. Cl. ..................................... 346/108; 358/298
[58] Field of Search .................. 346/108, 107 R, 160, 346/76 L; 358/296, 298, 300, 302; 355/200, 202

[56] References Cited

U.S. PATENT DOCUMENTS

| | | | |
|---|---|---|---|
| 4,578,689 | 3/1986 | Spencer et al. | 346/160 |
| 4,613,877 | 9/1986 | Spencer et al. | 346/160 |
| 4,700,201 | 10/1987 | Sato | 346/108 |
| 4,717,925 | 1/1988 | Shibata et al. | 346/108 |
| 4,734,715 | 3/1988 | Shiraishi | 346/108 |
| 4,742,363 | 5/1988 | Shiraishi | 346/108 |
| 4,899,176 | 2/1990 | McQuade | 346/108 |
| 4,953,036 | 8/1990 | Yoshimura | 358/400 |
| 5,072,303 | 12/1991 | Silverburg | 358/296 |
| 5,101,283 | 3/1992 | Seki et al. | 358/298 |

OTHER PUBLICATIONS

LaserMaster Corporation pamphlet; TrueTech AFM Controller.
LaserMaster Corporation pamphlet; Professional Controller.
DP-TEK, Inc. pamphlet; TruePoint Intelligent Printer Controller.

*Primary Examiner*—Mark J. Reinhart

[57] ABSTRACT

Disclosed is a laser printer (100) which employs existing mechanical and electrical components by using a method which trades print resolution for paper speed. By changing various combinations of the laser spot size, paper motion speed, $V_p$, video data rate, $f_d$, and scanner speed, $\omega_s$, printer resolutions between 75 DPI and 900 DPI are simultaneously possible in both the horizontal and the vertical directions using existing engines such as the Canon LBRLX laser engine with only slight modifications.

8 Claims, 2 Drawing Sheets

CONTINUOUSLY VARIABLE RESOLUTION LASER PRINTER

BACKGROUND OF THE INVENTION

Technical Field

This invention generally relates to laser printers and more particularly, this invention relates to a laser printer having continuously selectable printing resolutions. That is to say that the printer is capable of printing at almost any vertical and/or horizontal resolution over a very wide range of possible resolutions, for example, anywhere from 75 to 1200 dots-per-inch in both the horizontal and vertical directions.

Background Art

Within the last decade, laser printers have become the standard against which all other printers are measured in the personal computing industry. Understandably, a large amount of research has been recently undertaken to increase their versatility and print quality. This has resulted in the development of personal laser printers having resolutions in excess of 600 DPI (dots-per-inch) and in laser printers capable of printing at a few discrete resolutions.

FIG. 1 of the attached drawings shows a representational diagram of a basic laser printer configuration, to which the reader is referred to aid in the following explanation of the electrophotographic process for recording and registering an image on paper. In general terms, a personal computer sends a series of codes representing an image to the input port 27 of the laser printer. The laser printer converts the codes to a series of binary signals, each of which generally represents one dot, either black or white, of the thousands of dots which together form the image. The binary signals are used to pulse the beam of a laser such that the binary pattern is represented or transmitted by turning off and on the laser. This pattern is then recorded on a light sensitive drum which transfers the pattern onto a printing medium, such as paper, in the form of toner or a similar indelible substance.

As can be seen in FIG. 1, once the data has been transmitted to the laser printer it is analyzed in the formatter 11, here consisting of a first microprocessor 23 and related programmable memory 24 and a page buffer 12. Formatter 11 parses out the printer control commands from the text and graphics, and manipulates the text and graphics in accordance with the printer control commands and user input control codes from user input and display panel 25. The formatter 11 then stores an electronic representation of the printed page in the memory of the printer. Actually, the image stored is a mirror image since it will ultimately be transferred to the paper much the same way as an iron-on applique.

Once the page has been formatted, it is transmitted to the page buffer 12. Page buffer 12, usually three or more individual strip buffers, breaks the electronic page into a series of lines or "strips" one dot wide. This strip of data is then sent to a circuit which drives the laser 13.

The data is used to modulate the light beam produced by laser 13 such that the beam of light "carries" the data. The modulation of the beam is accomplished by laser driver-controller 26. The laser beam is then "bounced" or reflected off of a multifaceted spinning mirror 14. Here, the multifaceted mirror is shown as a six sided polyhedron, however as few as two facets are common. As each facet of the mirror 14 spins through the light beam, it reflects, or "scans", the beam across the side of a photoconductive drum 15. The photoconductive drum 15 is rotated about its axis such that it advances just enough that each successive scan of the light beam is recorded immediately after the previous scan directly on the photoconductive drum 15. In this manner, each strip of data from the page buffer 12 is recorded on the photoconductive drum 15, as a line one after the other to reproduce the page on the drum.

The laser beam actually discharges the area on the photoconductive drum 15 it irradiates. The photoconductive drum 15 is first charged using a high voltage primary corona wire, shown at 16, to have a negative polarity at its surface. Because of the special photoconductive material which covers the drum, the laser beam effectively discharges any areas which it irradiates. This process creates a "latent" electrostatic image on the drum. This portion of the drum then comes into close proximity to the developing roller 17 which rotates counter clockwise, or opposite to the photoconductive drum 15. The developing roller 17 transfers the toner from the toner bath to the photoconductive drum 15. Here, a dry toner is used which consists of fine thermoplastic particles impregnated with a ferromagnetic material such as iron. The developer roller 17 uses the negative pole of an internal magnet to attract the toner. Tribo electric charging results in a negative charge to the particles themselves. The developer roller 17 is electrically biased so as to repel the charged toner to the image areas. In this manner, the toner is transferred to the photoconductive drum 15 and forms a pattern thereon which duplicates the image.

The toner is transferred from the photoconductive drum 15 to the printing medium, e g. paper 18, using an electrostatic process. Here a second corona wire, transfer corona 19, is used to impart a relatively strong positive charge to the back side of the paper 18 as it passes by the photoconductive drum 15. The high positive charge attracts the negatively charged toner and pulls it from the drum, maintaining the same pattern. The toner is then fused to the paper 18 by passing both the toner and paper through a pair of hot fusing rollers 20.

The photoconductive drum 15 usually has a circumference which is less than the length of most paper. Hence, the drum must rotate several times to print a full sheet. The drum is cleaned with cleaning blade 21, completely discharged by discharge lamps 22 and recharged by corona 16.

The following discussion concerns references, of which the inventors are aware, showing technologies and improvements related to the instant invention.

U.S. Pat. No. 4,578,689 issued March, 1986 to SPENCER ET AT. for a Dual Mode Laser Printer teaches a laser printer having two modes for printing at different resolutions. The first is a high speed/low resolution mode and the second is a low speed/high resolution mode. The disclosure claims that the printer is capable of printing up to 16 pages per minute in low resolution mode, i.e. less than 400 DPI (dots-per-inch), and at approximately 4 pages per minute in high resolution mode, i.e. above 500 DPI. The printer accomplishes this by changing the speed of the paper drive and photoconductive drum using stepper motors, adjusting the heat produced by the fuser, adjusting the corona current in the electrophotographic process, controlling the laser output power and controlling the number of facets of the rotating mirror which are actually used to scan the photoconductive drum. The speed of the rotating mirror is kept constant regardless of the resolution selected. When reducing both the speed of the paper and the photoconductive drum, only every other, or fewer, facets of the rotating mirror are used, thus allowing enough time to elapse to permit the information to be accumulated without increasing the data transfer rate to the printer.

U.S. Pat. No. 4,613,877 issued September, 1986 to SPENCER ET AL. for a High Resolution Laser Printer teaches essentially the same thing as U.S. Pat No. 4,578,689 discussed above. However, this patent concentrates on scan error correction using both optical and electronic means. The scan error is introduced as a result of the rotating polyhedron faceted mirror which is used to reflect or "scan" the laser beam across the photoconductive drum. The linear velocity of the beam as it travels across the photoconductive drum is not constant and is proportional to the rotational velocity of the rotating mirror. Consequently, the velocity of the beam, in the reference frame of the surface of the photoconductive drum, is greatest at the edges of the drum and decreases as the beam approaches the middle of the drum. This invention corrects for this error by varying the data flow rate such that the data will be applied at a constant velocity as the beams scans across the drum.

U.S. Pat. No. 4,700,201 issued October, 1987 to SATO for a Dot Corrected Laser teaches an image enhancement technique which varies the size of the dot produced dependant upon whether the dot is relatively isolated, e.g. not completely surrounded by other dots immediately adjacent to it, or in a densely populated area of the image. If a particular dot is determined to be isolated, the invention will increase the size of the dot by varying the duty cycle of the laser. In a positive exposure system, the "on time" of the laser is increased while in a negative exposure system the "off time" of the laser is increased. The invention uses either a modified driver circuit or an acousto-optic modulator to control the duty cycle of the irradiation to vary the spot or dot sized produced.

U.S. Pat. No. 4,717,925 issued January, 1988 to SHIBATA ET AL. for an Optical Scanner Without Extra Convergent Lens teaches a scanner error correction device which is similar in concept to that described in U.S. Pat. No. 4,613,877 discussed above. Additionally, this patent teaches an adjustable intensity laser beam using a photodetector, cooperating driver controller and laser driver to continuously adjust the intensity of the beam. As the data video rate increases, the intensity of the beam is increased to provide a uniform spot or dot size regardless of the shortened duty cycle.

U.S. Pat. No. 4,734,715 issued March, 1988 to SHIRAISHI for a Variable Light Beam Scanning Apparatus teaches a variable resolution laser printer. The variable resolution is accomplished by controlling the scan velocity of the laser beam, the video data frequency at which the laser beam is modulated and the spot diameter or dot size. The scan velocity of the laser beam is varied by controlling the rotational speed of the polyhedron faceted mirror, while the video data rate or frequency is varied by adjusting the clock rate and the laser spot diameter is varied by controlling the drive current supplied to the laser diode.

U.S. Pat. No. 4,742,363 issued May, 1988 to SHIRAISHI for a Variable Intensity Light Beam Scanning Apparatus With Feedback teaches essentially the same laser printer disclosed in U.S. Pat. No. 4,734,715 but concentrates on the circuit for controlling the light intensity of the laser beam produced by the laser diode by controlling the drive current.

U.S. Pat. No. 4,899,176 issued February, 1990 to MCQUADE for a Method of Reducing Average Data Rate in Rotating Mirror Laser Recorder teaches a method and apparatus for matching the rate at which the laser printer processes data to the rate at which the host device, such as a personal computer, supplies data to be printed. This is accomplished by reducing the number of facets of the polyhedron mirror which are actually used to scan data lines and also reducing the paper travel rate through the electrophotographic process.

U.S. Pat. No. 4,953,036 issued August, 1990 to YOSHIMURA for a Digital Copier Having Switchable Pixel Densities teaches a digital copy machine/laser printer having a high resolution mode (in excess of 400 DPI) for digital copy reproduction and a low resolution mode (240/300 DPI) for printing as a laser printer. The resolution switching is provided by one or more of the following configurations including: two separate lens systems, one for producing a reduced dot size and one for the regular dot size; a single lens system positionable at different points in the optical path of the laser to vary the spot size; changing the illumination time of the laser beam; or changing the rotational speed of the polyhedron mirror.

U.S. Pat. No. 5,072,303 issued December, 1991 to SILVERBERG teaches a laser printer which acts both as a standard 300 DPI laser printer and as a device for receiving and printing fax images. The printer is capable of printing in a 300×300 DPI laser printer mode, a 200×200 DPI "fine" fax mode and a 100×200 "normal" fax mode. The patent further teaches controlling the spot size produced by the laser diode using pulse width modulation of the drive signal or by controlling the drive current supplied to the laser light source.

It is readily apparent from the forgoing disclosure that many attempts have been made to satisfy the desire among consumers for a high resolution laser type printer which is capable of printing over a large range of both high and low resolutions to facilitate printing of low resolution fax images, high resolution fax images, draft text and graphics, letter quality text, high resolution graphics and even high resolution digital copies and photographs. Unfortunately, none of the aforementioned solutions has found wide acceptance in the market. The failures of the foregoing devices are primarily due to the relatively narrowly defined purposes of the devices which limit the versatility of any particular device to the consumer, as all of these devices are limited to two or three discrete resolutions.

It is therefore an object of this invention to provide a multipurpose continuously variable resolution laser printer. Other objects of this invention are to provide at least two variations of a method of printing on a laser printer at virtually any resolution over a large range of resolutions.

DISCLOSURE OF INVENTION

These objects, and others, are accomplished by a laser printer employing existing mechanical and electrical components by using a method which trades print resolution for paper speed. By changing various combinations of the developed laser spot size, paper motion speed, video data rate and scanner speed, printer resolutions between 75 DPI and 900 DPI, possibly higher, are possible in both the horizontal and the vertical directions using existing engines such as the Canon LBRLX laser engine with only slight modifications.

The following two equations demonstrate the relationships between the different variables referenced above:

$$\text{Horizontal Resolution} = \frac{\text{Video Rate}}{\text{Scanner Speed}} \quad (1)$$

$$\text{Vertical Resolution} = \frac{(\text{Number of Mirror Facets})(\text{Angular Scanner Speed})}{\text{Paper Speed}} \quad (2)$$

For instance, according to equations 1 and 2, to double the resolution of the CANON LBRLX engine from 300 DPI to 600 DPI one could increase the scanner speed by 50%, decrease the paper speed from 4 pages per minute to 3 pages per minute and increase the video rate by a factor of 3.

The first modification necessary is the provision of a variable speed drum and paper drive assembly motor to vary the speed at which data is registered on the drum in the vertical direction, i.e. the direction of paper travel, and subsequently transferred to the printing medium. The second modification which is necessary is reconfiguring the control circuit which generally means reprogramming the microprocessor in the formatter, the microprocessor in the attached personal computer and/or the microprocessor in the process synchronizer control circuit to calculate the paper/drum speed, the necessary developed spot size, a pulse width modulation factor, the video rate and the rotational speed of the mirror. Generally, a separate process synchronizer control circuit monitors and controls the various components within the laser printer such as toner level indicators, paper tray indicators, scanner beam position detectors, etc. Since the microprocessors are usually at least 16 bit processors, there should be more than enough computing power for the purposes of the present invention, however, if necessary an additional processor can be added to handle the calculations, or the attached personal computer can easily be configured to handle this task. The third modification which is necessary is the provision of a variable frequency clock to drive the data flow to and from the page buffer responsive to the calculated video rate. The fourth modification is the provision of a variable speed scanner or mirror motor to drive the multifaceted mirror at the proper rotational velocity responsive to the calculated video rate.

Once a particular resolution is selected either through the user input panel or automatically via software, the control circuit, usually one or more microprocessor(s), calculates the paper/drum velocity, the rotational velocity of the mirror and the video data rate and transmits these values to their respective components to alter the resolution produced by the laser printer to an resolution within the physical bounds of the laser engine.

MODE FOR CARRYING OUT INVENTION

Figure 1:
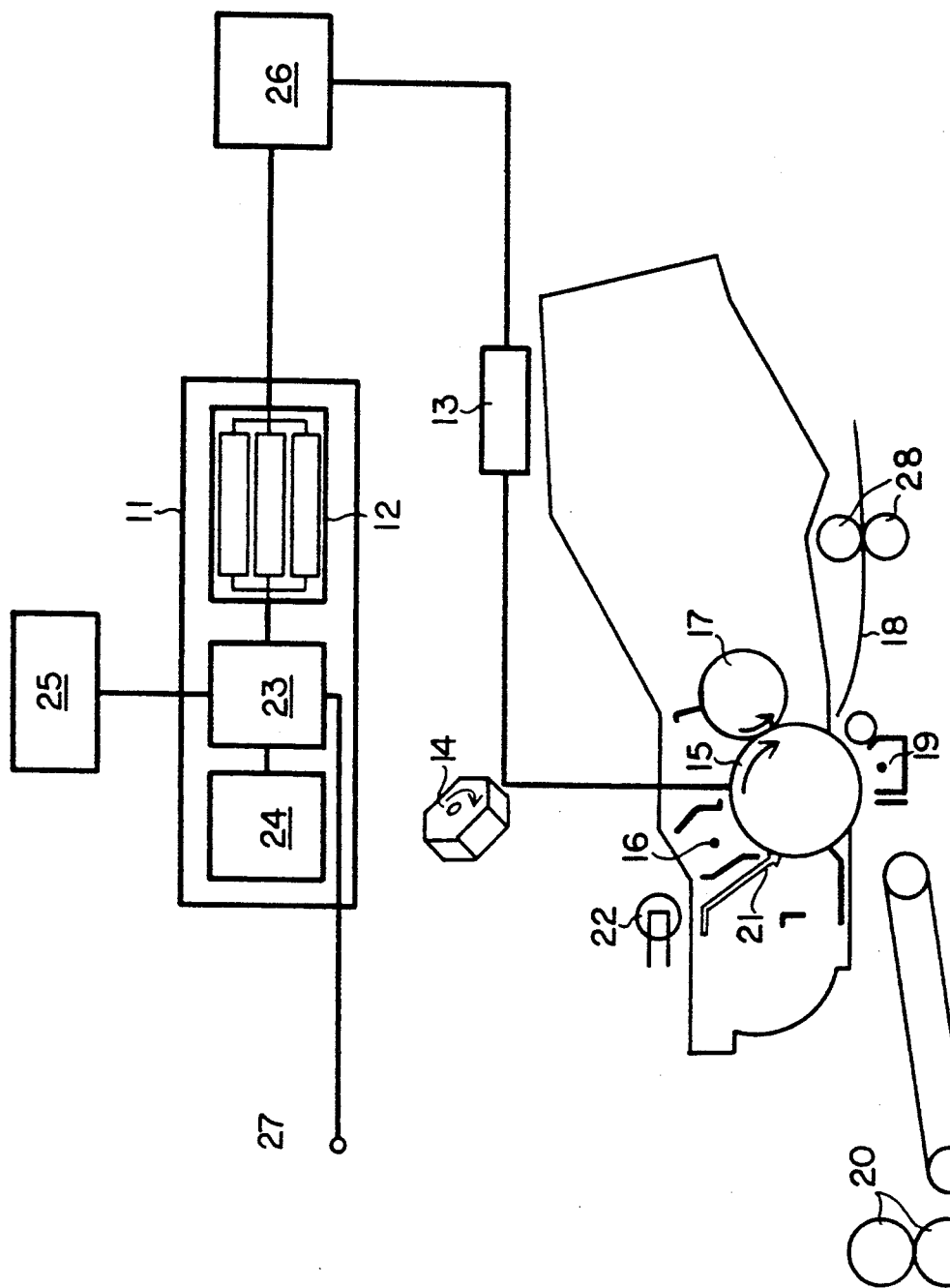
FIG. 1 is a schematic representation of the standard laser printer.
Figure 2:
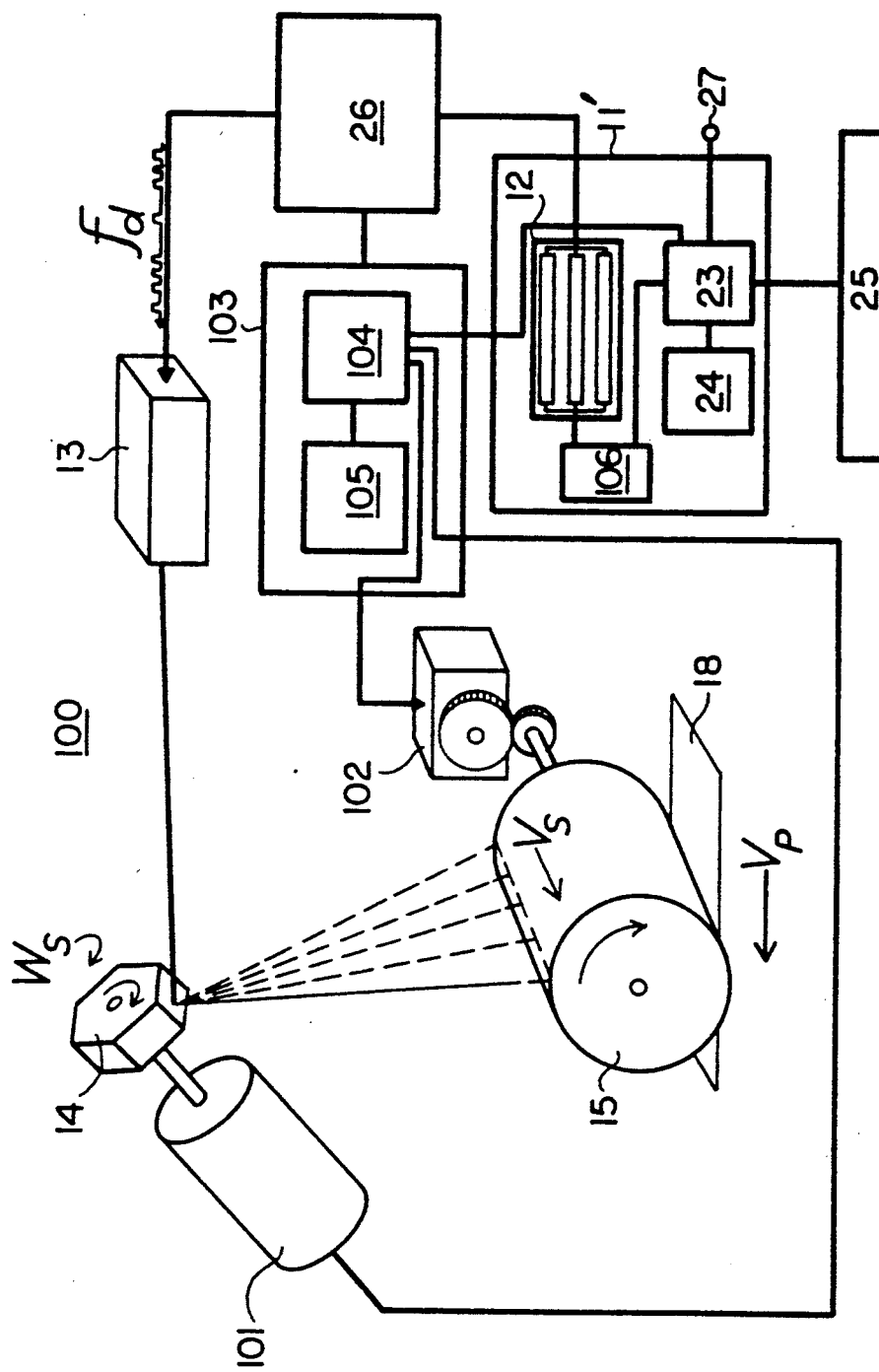
FIG. 2 is a schematic representation of the Continuously Variable Resolution Laser Printer.

Referring now to the figures, the variable resolution laser printer 100 is shown in block diagram-representational form. Variable resolution laser printer 100 uses the basic laser engine of the prior art with the addition of a modified formatter 11', a variable speed mirror motor 101, a variable speed drum and paper driver 102, a variable frequency clock pulse generator 106 and possibly a modified process control circuit 103 or attached personal computer, not shown.

The laser driver-controller 26, the variable speed mirror motor 101, variable frequency clock 106 and the variable speed drum and paper driver 102 are all electrically connected to and controlled by the process control circuit 103 and/or formatter 11'. Either the process control circuit 103, employing a microprocessor 104 and associated programmable memory 105, and/or the formatter 11', also employing a microprocessor 23 and associated programmable memory 24, can calculate the rotational speed of the multifaceted polyhedron scanning mirror 14, the base frequency rate at which the page buffer 12 supplies data to the laser driver-controller 26 and the speed of the variable speed drum and paper driver 102. Additionally, the process control circuit 103 or the formatter 11' can calculate and provide the laser 13 with a specific level of drive current to produce a desired energy distribution of light radiation o photoconductive drum 15 and thereby alter the size of dots registered on the drum 15. Alternatively, either the process control circuit 103 or the formatter 11', via laser driver-controller 26, can pulse width modulate the data stream from the page buffer 12 to reduce the duty cycle of the laser 13 and thereby reduce the diameter of dots produced. Additionally, a combination of the two methods, i.e. pulse width modulation and adjusting the drive current, ca be employed to regulate the spot size produced by the laser 13.

The programmable memory 24 of the formatter 11' and/or the programmable memory 105 in the process control circuit 103 calculate the various values using equations 3 and 4 below.

$$\text{Horizontal Resolution} = \frac{\text{Video Rate}}{\text{Scanner Speed}} \quad (3)$$

$$\text{Vertical Resolution} = \frac{(\text{Number of Mirror Facets})(\text{Angular Scanner Speed})}{\text{Paper Speed}} \quad (4)$$

In order to express equations 3 and 4 more succinctly, we will let $R_h$ = Horizontal Resolution (5)

(dots per inch)

$R_v$ = Vertical Resolution (dots per inch)

$f_d$ = Video Rate (i.e. frequency)

(cycles per minutes)

$N_f$ = Number of Mirror Facets $V_s$ = Scanner Speed (inches per second)

$\omega_s$ = Rotational Velocity of Mirror (revolutions per minute)

$V_p$ = Paper Speed (inches per second)

so equations 3 and 4 become $$R_v = \frac{(N_f)(\omega_s)}{(V_p)(60 \text{ seconds})} \quad (6)$$

We can define the linear scan velocity, $V_s$, of the laser beam in terms of the rotational velocity of mirror 14, rendering $$V_s = \frac{(\omega_s)(N_f)(\text{PhotocondutorWidth})}{\alpha (60 \text{ seconds})} \quad (7)$$

where $$\alpha = \frac{\left(\frac{\text{Degrees of rotation}}{\text{Image Scan}}\right)}{\left(\frac{360°}{N_f}\right)}$$

Solving equation 8 for the rotational mirror velocity, renders $$\omega_s = \frac{\alpha (60 \text{ seconds})(V_s)}{(N_f)(\text{PhotoconductorWidth})} \text{ RPM}. \quad (8)$$

Substituting this value for $\omega_s$, into equation 7 yields $$R_v = \frac{\alpha (V_s)}{V_p (\text{PhotoconductorWidth})} \quad (9)$$

Now, we can solve equations 6 and 10 for $V_s$, set the equations equal to one another, and solve first for the video rate and second for the paper speed to render the following set of equations:

$$\frac{(f_d)}{(R_h)} = \frac{(R_v)(V_p)(\text{PhotoconductorWidth})}{(\alpha)} \quad (10)$$

$$f_d = \left(\frac{(R_v)(R_h)(\text{PhotoconductorWidth})}{(\alpha)}\right) V_p$$

$$V_p = \left(\frac{(\alpha)}{(R_v)(R_h)(\text{PhotoconductorWidth})}\right) f_d.$$

Using an iterative process, the microprocessor can solve for the maximum page speed, $V_p$, by first assuming the maximum speed to be equal to the maximum speed as dictated by the manufacturer of the particular laser engine and then testing the resulting video rate, $f_d$, to see if it is within the physical bounds of the formatter 11'. Alternatively, the microprocessor can first solve for the video rate, $f_d$, by first assuming a maximum value which is equal to the maximum value the formatter can handle. Similarly, if the resulting page speed, $V_p$, is greater than the maximum speed at which the laser engine is capable of printing, the video rate is incrementally reduced and the process is repeated.

However, the video rate, which must be less than the maximum frequency as dictated by the formatter 11', may not be exactly that as is defined by equation in equation set 8. Instead, depending on which method or combination of methods is used to control the dot size produced by the laser, that value of $f_d$ may first need to be multiplied by a pulse width modulation factor. Assuming that we are using solely pulse width modulation to control the dot size, we would need to multiply $f_d$ by a factor which is equal to the denominator of the fraction representing the decrease in the page speed, $V_p$. However, the final value of $f_d$ must be less than the maximum frequency at which the formatter 11' can be driven. Also, it is possible to continuously drive the formatter at its maximum frequency and use a software implementation to reduce the frequency at which the data is actually supplied to the laser. At any rate, all of these possibilities are intended to be within the scope of the variable frequency generation means, referred to in the Best Mode portion of this disclosure as variable frequency clock 106 and more broadly referred to in the claims as a variable frequency generation means.

Since the horizontal and vertical resolutions, $R_h$ and $R_v$, are known, as is the number or mirror facets, $N_f$, the microprocessor 11 can test the resulting video rate to see if it is within the limits of the formatter 11'. If not, the microprocessor can incrementally reduce the page speed until the video rate is within the limits of the formatter 11'.

Finally, using equation 6, we can solve for $V_s$ yielding $$V_s = \frac{f_d}{R_h}. \quad (11)$$

Substituting this value for $V_s$ into equation 9 yields the following, from which the microprocessor can solve for $\omega_s$, $$\omega_s = \frac{\alpha (60 \text{ seconds})}{R_h N_f (\text{PhotoconductorWidth})} f_d. \quad (12)$$

Like the video rate $f_d$, the microprocessor must check the resulting value of $\omega_s$ to make sure it is within the physical limits of the components. Judicious choices of one or more variables will ensure maximum performance and function.

An additional consideration concerning the continuously adjustable resolution laser printer 100 is the ability of the process control circuit 103 or formatter 11' to regulate the developed spot size. For the sake of comparison to the prior art, we will assume a reference resolution of 300 DPI in both the horizontal and vertical directions. In order to print at double this resolution, or 600 DPI, it is necessary to reduce the developed dot size to approximately ¼ of its original size. As discussed earlier, this can be accomplished by reducing the duty cycle or pulse width of the data supplied by laser driver/controller 26, by reducing the level of current used to power laser 13 or a combination of both. However, it should be noted that the relationship between the laser drive current and the intensity of the beam is not linear and the laser will stop lasing below a certain threshold level. This is one of the reasons it is preferable to regulate the spot size using pulse width modulation.

Using our previous example, we wanted to increase both the vertical and horizontal resolutions by a factor of 2 by increasing the scanner speed by 50%, decreasing the paper speed from 4 pages per minute to 3 pages per minute and increasing the video rate by a factor of 3. To reduce the developed dot size to approximately ¼ of its original size using solely pulse width modulation, assuming we are operating under linear conditions where the developed dot size is directly proportional to the time the laser irradiates any particular point, the pulse width modulation factor would be equal to 4. So, since we already increased the video rate by a factor of 3, increasing by an additional factor of 4 results in 12 times the original $f_d$, which must be less than the maximum frequency at which the formatter 11' can be driven, at least in this example.

However, it is important to realize that the size of the dot produced on the photoconductive drum 15 is a function of not only the spot size of the laser beam, but more importantly, the length of irradiation time and the intensity of the laser beam. Most, if not all, semiconductor lasers used today in laser printers become unstable at low current levels, so a proper balance should be struck between current level control of the dot size and using pulse width modulation to accomplish this task. We have found it more desirable to employ the pulse width modulation technique whenever possible, since the laser 13 can become unstable at lower current levels. However, the maximum modulation frequency is determined by the capabilities of the formatter 11' and page buffer 12. In order for the printer to double its resolution, the formatter 11' and buffer 12 must supply the print data at a much faster rate than the original rate. When you add to this, the burden of pulse width modulation to control dot size, it is possible to surpass the limits of present formatters and page buffers.

Using the relationships demonstrated by the above equations, process control circuit 103 and/or formatter 11' can calculate and optimize the laser modulation rate, the drive current level for laser 13, the scanning rate and the paper speed resulting in the printer being able to print at virtually any resolution within the bounds set by the capability of the print engine and the formatter 11'. As an example, we modified the CANON LBRLX to print at resolutions ranging from 75 DPI to 900 DPI quite satisfactorily. We found the upper limit on the formatter of the Hewlett-Packard LaserJet IIP to be approximately 50 Mhz, which produced a print out of 900 DPI. By reducing the drive current level to the laser, in combination with pulse width modulation, we may be able to obtain a resolutions upwards of 1200 DPI.

While there is shown and described the present preferred embodiment of the invention, it is to be distinctly understood that this invention is not limited thereto but may be variously embodied to practice within the scope of the following claims.

We claim:

1. A continuously variable resolution printer which comprises:
    an electrophotographic image recording and registration means, including a photoconducting medium, for recording an image generated by light pulses and transferring the image to a printing medium such as paper;
    input means for inputting an image of known width, control codes and user selected parameters such as vertical resolution and horizontal resolution;
    formatting means, being connected to the input means, for converting the image, control codes and user selected parameters into a data stream to be used to modulate a laser;
    laser means for emitting a modulated beam of light pulses;
    laser control means, being connected to the laser means and the formatting means, for modulating the laser at variable base frequencies and variable widths of modulating pulses to transmit the data from the formatting means;
    variable frequency generation means, being connected to the formatting means and the laser control means, for generating a clock signal to supply a base frequency for data transfer and laser modulation,
    variable speed scanner means for scanning the modulated laser beam in both vertical and horizontal directions across the photoconductive medium wherein the means for scanning the beam in the horizontal direction includes at least one rotating mirror facet;
    a control circuit being connected to the formatting means, the laser control means, the variable frequency generation means and the variable speed scanner means wherein the control circuit is configured to calculate:
    a) a paper speed, according to the equation $$V_p = \left( \frac{(a)}{(R_v)(R_h)(\text{PhotoconductorWidth})} \right) f_d$$

where $V_p$ = Paper Speed
$f_d$ = Video Rate
$R_v$ = Vertical Resolution
$R_h$ = Horizontal Resolution $$a = \frac{\left( \frac{\text{Degrees of Rotation}}{\text{Image Scan}} \right)}{\left( \frac{360°}{N_f} \right)}$$

and a base frequency according to the equation $$f_d = \left( \frac{(R_v)(R_h)(\text{PhotoconductorWidth})}{(a)} \right) V_p$$

where this resulting base frequency is additionally multiplied by the denominator of a fraction representing any decrease in the paper speed from a maximum value,
by first assuming that the paper speed is equal to a predetermined maximum value and then checking to see if the resulting base frequency is below any physical limitations of either the formatting means or the frequency generation means, and if not, iteratively reducing the paper speed until the resulting base frequency is within any limits dictated by the formatting means or the frequency generation means;
b) a rotational mirror velocity according to the equation $$\omega_s = \frac{a \, (60 \text{ seconds})}{R_h \, N_f (\text{PhotoconductorWidth})} f_d$$

where $\omega_s$ = Rotational Velocity of Mirror
$N_f$ = Number of Mirror Facets and to transmit the calculated paper speed value and the calculated rotational mirror velocity value to the scanner means and to transmit the calculated base frequency value to the variable frequency generation means and the formatting means;

the variable speed scanner means being configured to rotate the mirror facet at the calculated rotational mirror velocity and scan the laser beam in the vertical direction at the calculated paper speed velocity; and the variable frequency generation means and the formatting means being configured to modulate the laser beam at the calculated video rate.

2. The continuously variable resolution laser printer of claim 1 further comprising:

the laser control means being configured to supply variable levels of current to the laser means, responsive to the control circuit, to thereby control the size of spot produced by the laser beam; and the control circuit further being configured to calculate a maximum current level at which the laser means can be driven without increasing the resulting dot diameter beyond what is necessary to render the desired resolutions and to transmit this value to the laser control means.

3. The continuously variable laser printer of claim 2 wherein the control circuit comprises:

a microprocessor; and associated memory being electrically connected to the microprocessor.

4. The continuously variable laser printer of claim 1 wherein the control circuit comprises:

a microprocessor; and associated memory being electrically connected to the microprocessor.

5. A method for printing at continuously variable horizontal and vertical printing resolutions using a laser printer having a photoconductive drum, a paper drive mechanism, a laser and a scanning mirror, comprising the steps of:

inputting a desired horizontal resolution;

inputting a desired vertical resolution;

first, calculating a paper speed by first assuming that it is equal to a maximum predefined value and solving for a video rate value according to the equation $$f_d = \left( \frac{(R_v)(R_h)(\text{PhotoconductorWidth})}{(\alpha)} \right) V_p$$

where $V_p$ = Paper Speed
$f_d$ = Video Rate
$R_v$ = Vertical Resolution
$R_h$ = Horizontal Resolution $$\alpha = \frac{\left( \frac{\text{Degrees of Rotation}}{\text{Image Scan}} \right)}{\left( \frac{360°}{N_f} \right)};$$

second, comparing the resulting video rate with a predetermined maximum value and if the resulting video rate is greater than the predetermined maximum value, reducing printing speed and repeating the process until the resulting video rate is equal to or less than the predefined maximum video rate;

calculating a rotational mirror velocity according to the equation $$\omega_s = \frac{\alpha \, (60 \text{ seconds})}{R_h \, N_f (\text{PhotoconductorWidth})} f_d$$

where $\omega_s$ = Rotational Velocity of Mirror
$N_f$ = Number of Mirror Facets;

driving the photoconductive drum and drive paper feed mechanism at the resulting paper speed;

modulating a laser beam produced by the laser at the resulting video rate; and driving the scanning mirror at the resulting rotational mirror velocity.

6. The method of claim 5 wherein the predetermined maximum value of the video rate is reduced by a pulse width modulation factor, which is equal to the denominator of a fraction representing the decrease in the paper speed, such that the product of the resulting video rate and the pulse width modulation factor does not exceed the predetermined maximum value.

7. A method for printing at continuously variable horizontal and vertical printing resolutions using a laser printer having a photoconductive drum, a paper drive mechanism, a laser and a scanning mirror, comprising the steps of:

inputting a desired horizontal resolution;

inputting a desired vertical resolution;

first, calculating a video rate by first assuming that the video rate is equal to a maximum predefined value and solving for a paper speed value according to the equation $$V_p = \left( \frac{(\alpha)}{(R_v)(R_h)(\text{PhotoconductorWidth})} \right) f_d$$

where $V_p$ = Paper Speed
$f_d$ = Video Rate
$R_v$ = Vertical Resolution
$R_h$ = Horizontal Resolution $$\alpha = \frac{\left( \frac{\text{Degrees of Rotation}}{\text{Image Scan}} \right)}{\left( \frac{360°}{N_f} \right)};$$

second, comparing the resulting printing speed with a predetermined maximum value and if the resulting printing speed is greater than the predetermined maximum value, reducing the video rate and repeating the process until the resulting printing speed is equal to or less than the predefined maximum printing speed;

calculating a rotational mirror velocity according to the equation $$\omega_s = \frac{\alpha \, (60 \text{ seconds})}{R_h \, N_f (\text{PhotoconductorWidth})} f_d$$

where

-continued $\omega_s$ = Rotational Velocity of Mirror
$N_f$ = Number of Mirror Facets;

driving the photoconductive drum and drive paper feed mechanism at the resulting speed;

modulating a laser beam produced by the laser at the resulting video rate; and driving the scanning mirror at the resulting rotational mirror velocity.

8. The method of claim 7 wherein the predetermined maximum value of the video rate is reduced by a pulse width modulation factor, which is equal to the denominator of a fraction representing the decrease in the paper speed, such that the product of the resulting video rate and the pulse width modulation factor does not exceed the predetermined maximum value.

* * * * *